May 11, 1926.

A. O. VAN DERVORT 1,584,409

AXLE OIL GUARD

Filed June 8, 1922    2 Sheets-Sheet 1

Inventor:
Adrian O. Van Dervort

By
Frank C. Curtis
Attorney

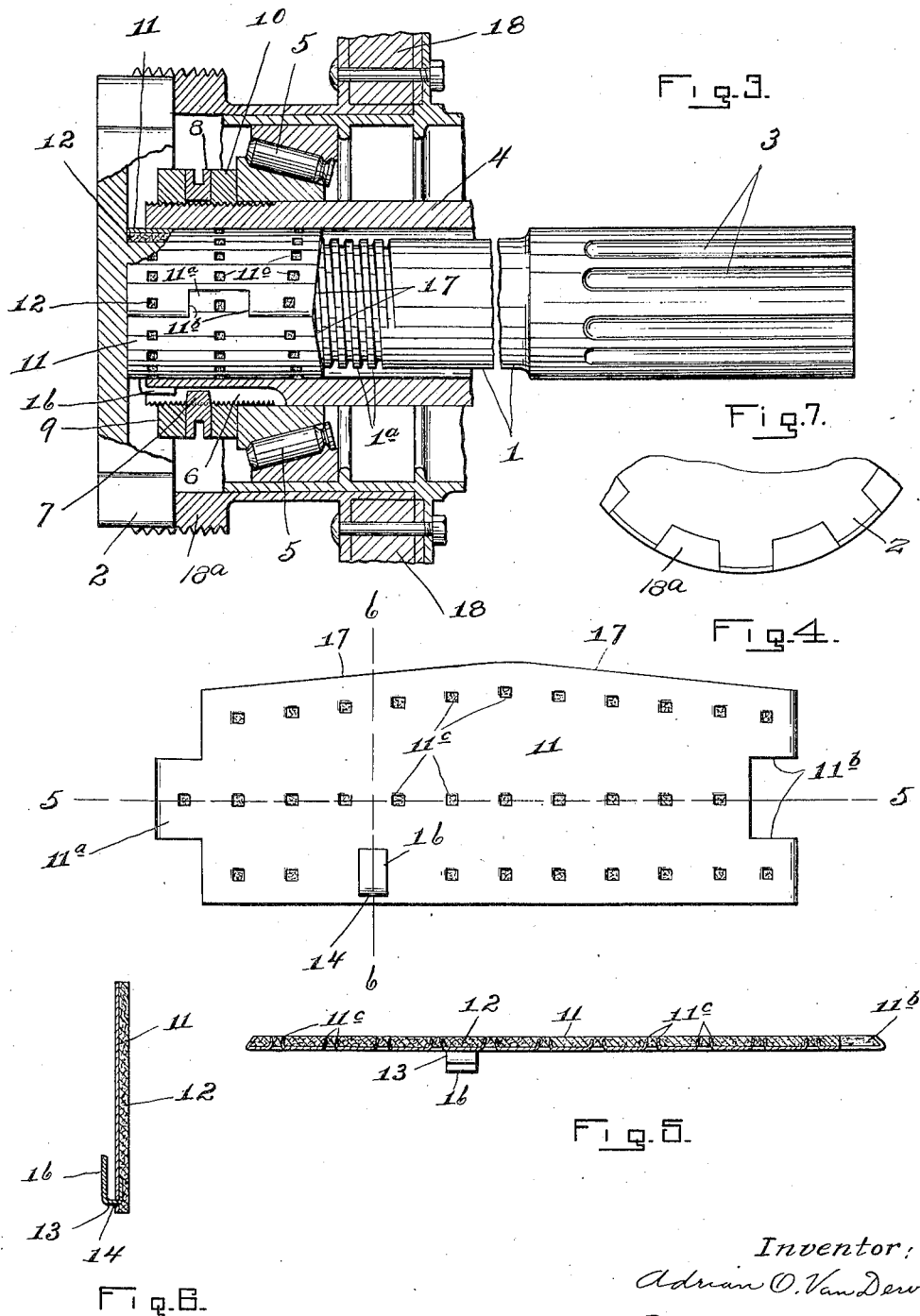

Patented May 11, 1926.

1,584,409

UNITED STATES PATENT OFFICE.

ADRIAN O. VAN DERVORT, OF TROY, NEW YORK.

AXLE OIL GUARD.

Application filed June 8, 1922. Serial No. 566,908.

This invention relates to oil-guards for preventing the creeping of oil along a rotating axle.

The invention is particularly adapted for preventing oil from passing from the differential of an automobile outwardly along the floating axles.

Oil so escaping from the differential leaks out past the hub-caps and is thrown upon the wheels and also upon the brakes, the result being not only unsightly but also a source of danger in causing the brakes to fail in their operation.

The principal object of the present invention is to prevent the oil from creeping outwardly along the floating axles of an automobile.

Other objects will appear in connection with the following description.

Fig. 1 of the drawings is a view partly in side elevation and partly in longitudinal section of broken-away portions of a floating-axle and axle-housing of an automobile showing my improved oil-guard applied thereto.

Fig. 3 is a central longitudinal section of the same taken on the broken line 3—3 in Fig. 1.

Fig. 4 is a plan view of the detached oil-guard opened out flat.

Fig. 5 is a longitudinal section of the same taken on the broken line 5—5 in Fig. 4.

Fig. 6 is a cross-section of the same taken on the broken line 6—6 in Fig. 4.

Fig. 7 is an end view of a broken-away portion of the hub of the wheel and the toothed hub of the floating axle engaged therewith.

Figure 1:
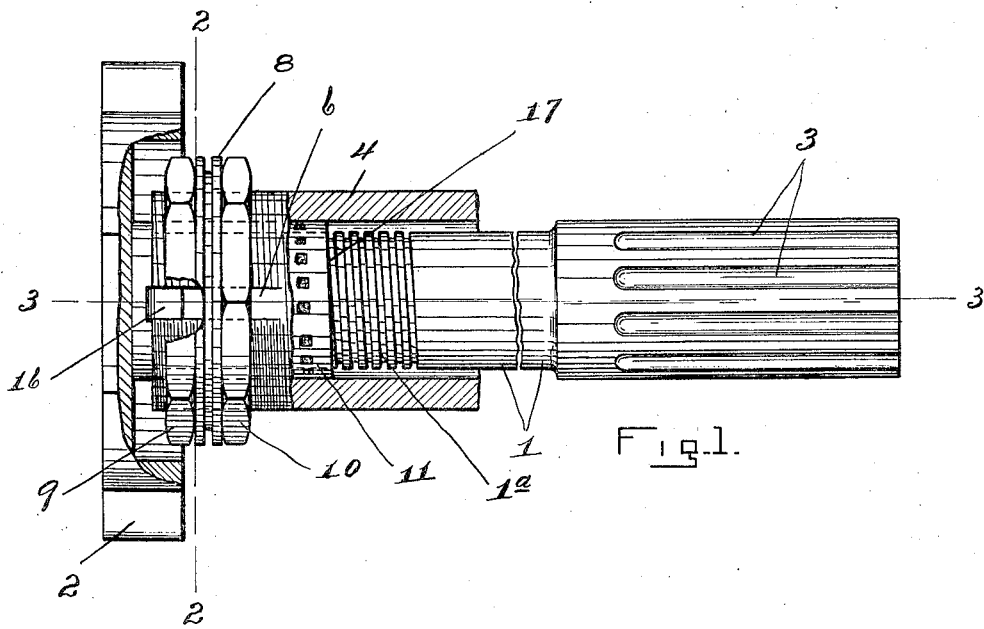

Referring to the drawings wherein the invention is shown in preferred form, 1 is a floating-axle of an automobile, having on its outer end the toothed hub, 2, adapted to engage the hub 18ª of one of the driving wheels, 18.

The inner end of the axle, 1, is enlarged and provided with the usual keyways, 3, for engagement with one of the pinions of the differential, not shown.

The portion of the axle between the hub, 2, and the key-end, 3, is of reduced diameter as shown.

The axle passes through a housing, 4, upon which is mounted the roller bearing, 5, which rotatively supports the driving wheel, 18.

This housing is formed with a key-groove, 6, adapted to receive a key, 7, upon a washer, 8, interposed between the lock nuts, 9 and 10, which determine the adjustment of the roller-bearing.

The parts thus far described are commonly found in automobiles of the full-floating-axle type, and in the use of axles of this type the oil gradually works outwardly along the axle, 1, as the same is rotated until it escapes from the hub-cap of the wheel, not shown.

In carrying out my invention in the preferred form shown in the drawings, I place around the portion of the axle, 1, of reduced diameter, within and at the outer end of the housing, 4, a sleeve, 11, of resilient sheet-metal lined with fibrous material, and provide means for holding the sleeve in non-rotational contact with the axle.

I prefer to employ for this purpose resilient sheet-metal such as bronze for the body of the sleeve, although for certain purposes of the invention any thin sheet-material might be employed which would provide the proper support for the fibrous material; and I prefer to employ a thin body of felt for the fibrous lining, although for certain purposes of the invention, other fibrous fabrics might be employed.

The sleeve is split lengthwise to facilitate its application to the contracted portion of the axle.

The sleeve may be made from flat stock as shown in Figs. 4, 5 and 6, and rolled into sleeve-form when it is desired to apply the device to the axle.

The felt fabric, 12, may be secured to the body, 11, in any known manner. A convenient manner of securing the felt fabric to the body of the sleeve is by means of shellac or other suitable cement.

To more effectively secure the felt fabric to the body of the sleeve, I prefer to form upon the body of the sleeve, spurs or prongs, 11ᶜ, which spurs or prongs are formed by forcing suitable dies or punches through the sheet metal body to which the felt fabric has been applied so that the ends of the spurs will become inserted in and interlocked directly with said felt fabric.

As shown in Fig. 5, the ends of the sheet-metal body, 11, of the sleeve are introverted upon the ends of the felt fabric.

I have shown the ends of the split sleeve formed at one end with a tongue, 11ª, and at the opposite end with a notch, 11ᵇ, adapted to interlock with the tongue, 11ª, when the sleeve is applied to the axle to form a substantially full sleeve and to prevent relative lengthwise movement between the ends of the sleeve.

The sleeve has near its outer end a key-projection, 16, shown in the form of a hook adapted to engage the key-groove, 6, in the housing, by which engagement the sleeve is positively prevented from rotating with the axle, and is also prevented from working rearwardly along the axle.

This key-projection, 16, may be of any desired form adapted to engage the axle-housing to prevent rotation of the sleeve. In the preferred form shown, the key-projection is formed as a portion of a U-shaped key-member, 13, which passes through a slot, 14, formed in the metal body, 11, of the sleeve, having its inner end secured to the inner side of said metal body, as by soldering or welding.

The inner end of the sleeve may be cut obliquely or spirally as shown at 17.

Figure 2:
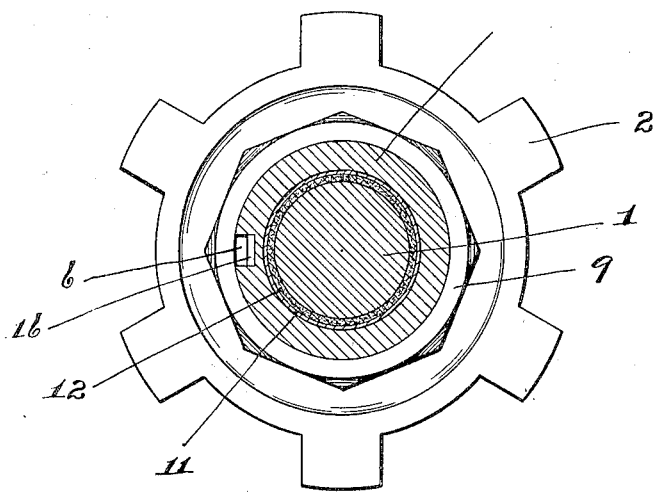
Fig. 2 is a cross section of the same taken on the broken line 2—2 in Fig. 1.

In applying the guard, the axle is partly withdrawn to expose the contracted portion of the same, and the lined sleeve, 11, is rolled around the contracted portion of the axle, and its ends interlocked as shown in Fig. 3, the sleeve thus forming a cylindrical enclosure for the axle as seen in Fig. 2.

The sleeve is then forced inwardly along the axle until the key-projection, 16, is seated in the key-groove, and the axle is then forced fully inward to engage the differential mechanism in the usual manner.

In the operation of the device, as the axle is rotated, oil working along the axle is brought into engagement with the inner end of the non-rotating sleeve which acts as a wiper to free the oil from the axle, and also as a dam to prevent the oil from passing further outwardly along the axle.

The oil is thus prevented from working outwardly to escape past the hub-cap.

The oblique form of the inner end of the sleeve as shown at 17, causes it to have a deflecting action upon the oil on the shaft, tending to force the oil away from the outer end of the shaft.

The fibrous lining, 12, is held in the form of a sleeve in surrounding contact with the axle, and by reason of its fibrous construction effectively engages the axle to wipe the axle and to serve as a dam to the outward passage of the oil as above described.

The metal sleeve, 11, serves as a support for the sleeve of fibrous material which directly engages the axle, and also as the means for preventing rotation of the sleeve of fibrous material with the axle; but I do not wish to be limited to a sleeve-form or ring-form holder for the sleeve of fibrous material, as for certain purposes of the invention, it is immaterial in what manner the sleeve is prevented from rotation with the axle while being supported in surrounding contact with the axle.

In the preferred form of my invention I form upon the portion of each axle to which the oil-guard is to be applied a spiral thread or groove, 1ª, that upon the right hand axle being of a left hand pitch and that upon the left hand axle of a right hand pitch, said screw-threaded or grooved portions of the axles thereby being adapted to cooperate more effectively with the felt fabric with which they engage.

In the preferred form of my invention, the felt fabric is in the form of a sleeve the length of which sleeve is several times the thickness of the wall of the sleeve, so that the felt fabric acts as a flexible wrapper for the axle.

What I claim as new and desire to secure by Letters Patent is—

1. An axle-oil-guard comprising a split sleeve of resilient sheet-metal lined with fibrous material provided near one end with a slot open at its outer end, and a key-member secured to the inner side of the metal portion of the sleeve, extending through said slot and forming an exterior key-projection on said sleeve.

2. An axle-oil-guard comprising a split sleeve of resilient sheet-metal lined with fibrous material, and having an oblique edge on its inner end, and means to prevent the guard from rotating with the axle.

3. In a device of the class described and in combination, a floating axle; a housing for the axle; a roller-bearing mounted upon the housing, said housing being formed with a keyway; means for adjusting the roller-bearing including a washer having a projection engaging said keyway; an oil-guard, including a sleeve of fibrous material in surrounding contact with said axle; and means engageable with said keyway for preventing rotation of the sleeve with the axle.

In testimony whereof, I have hereunto set my hand this 6th day of June, 1922.

ADRIAN O. VAN DERVORT.